United States Patent
Okusa (10) Patent No.: US 7,542,078 B2
(45) Date of Patent: Jun. 2, 2009

(54) IMAGE PROCESSING APPARATUS WITH ATTRIBUTION FILE CONTAINING ATTRIBUTION INFORMATION OF A PLURALITY OF IMAGE FILES

(75) Inventor: Chiaki Okusa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 887 days.

(21) Appl. No.: 10/368,880

(22) Filed: Feb. 18, 2003

(65) Prior Publication Data

US 2003/0158838 A1 Aug. 21, 2003

(30) Foreign Application Priority Data

Feb. 19, 2002 (JP) .............................. 2002/042049

(51) Int. Cl.
H04N 5/76 (2006.01)
(52) U.S. Cl. ............. 348/231.2; 348/231.3; 348/231.99
(58) Field of Classification Search ............ 348/231.99, 348/231.2, 231.3
See application file for complete search history.

(56) References Cited

U.S. PATENT DOCUMENTS

| 5,806,072 | A | | 9/1998 | Kuba et al. | |
|---|---|---|---|---|---|
| 6,011,547 | A | * | 1/2000 | Shiota et al. | ................ 382/254 |
| 6,273,535 | B1 | * | 8/2001 | Inoue et al. | ..................... 347/3 |
| 6,590,608 | B2 | * | 7/2003 | Matsumoto et al. | ...... 348/231.2 |
| 6,650,365 | B1 | * | 11/2003 | Sato | ......................... 348/231.3 |
| 6,741,864 | B2 | * | 5/2004 | Wilcock et al. | .......... 455/456.1 |
| 7,098,943 | B2 | * | 8/2006 | Shibutani | ................. 348/211.1 |
| 2002/0135687 | A1 | * | 9/2002 | Nakajima et al. | ......... 348/231.3 |
| 2003/0011684 | A1 | * | 1/2003 | Narayanaswami et al. ................................................. 348/207.99 |
| 2006/0274164 | A1 | * | 12/2006 | Kimura et al. | ........... 348/231.3 |

FOREIGN PATENT DOCUMENTS

| JP | 06-149905 | | 5/1994 |
|---|---|---|---|
| JP | 08-251528 | A | 9/1996 |
| JP | 11-127371 | A | 5/1999 |
| JP | 11-187292 | A | 7/1999 |
| JP | 2001-148803 | A | 5/2001 |
| JP | 2002-051280 | | 2/2002 |

OTHER PUBLICATIONS

The above references were cited in a Mar. 11, 2008 Japanese Office Action issued in the counterpart Japanese Patent Application 2002-042049.

* cited by examiner

*Primary Examiner*—David L Ometz
*Assistant Examiner*—Kelly L Jerabek
(74) *Attorney, Agent, or Firm*—Cowan, Liebowitz & Latman, P.C.

(57) ABSTRACT

An image processing apparatus generates a file including image data and attribution information, and generates a file wherein this attribution information is recorded together with other attribution information, and records these files on a storage medium. A data processing apparatus obtains the file wherein the attribution information of each image data is recorded, and processes the image data based on the corresponding attribution information.

3 Claims, 8 Drawing Sheets

| | | | | | | | | | |
|---|---|---|---|---|---|---|---|---|---|
| STITCH ASSIST MODE | OFF | OFF | OFF | OFF | OFF | OFF | OFF | OFF | ...... |
| MONOCHROME SEPIA | OFF | OFF | MONO-CHROME | SEPIA | OFF | OFF | OFF | OFF | ...... |
| COMMENT | PRESENT | PRESENT | PRESENT | NONE | NONE | PRESENT | NONE | NONE | ...... |
| AUDIO RECODING | OFF | OFF | ON | OFF | OFF | ON | OFF | OFF | ...... |
| RELEASE MEANS | MANUAL | MANUAL | TIMER PHOTOGRAPHING | MANUAL | MANUAL | MANUAL | MANUAL | TIMER PHOTOGRAPHING | ...... |
| CONTINUOUS PHOTOGRAPH | ON | ON | OFF | OFF | OFF | OFF | OFF | OFF | ...... |
| PHOTOMETRY VALUE OF EACH BLOCK | NONE | NONE | NONE | NONE | NONE | PRESENT | PRESENT | NONE | ...... |
| LENS | L1 | L1 | L1 | L1 | L1 | L2 | L2 | L3 | ...... |
| EXPOSURE CORRECTION AMOUNT | +1.0 | +1.0 | +1.5 | 0 | 0 | -1.5 | -1.5 | 0 | ...... |
| EXPOSURE TIME | 0.001 | 0.001 | 0.001 | 0.005 | 0.005 | 0.02 | 0.02 | 0.015 | ...... |
| SHUTTER SPEED | 0.001 | 0.001 | 0.001 | 0.005 | 0.005 | 0.02 | 0.02 | 0.015 | ...... |
| WHITE BALANCE | AWB | AWB | — | — | AWB | AWB | AWB | AWB | ...... |
| MULTI-POINT AUTOFOCUS | OFF | OFF | ON | ON | OFF | ON | ON | OFF | ...... |
| STROBE | OFF | OFF | OFF | OFF | ON | ON | ON | OFF | ...... |
| KIND OF CCD COLOR FILTER | PRIMARY COLOR | PRIMARY COLOR | PRIMARY COLOR | PRIMARY COLOR | PRIMARY COLOR | COMPLEMENTARY COLOR | COMPLEMENTARY COLOR | COMPLEMENTARY COLOR | ...... |
| PHOTOGRAPHING DATE | 02/01/01 12:01 | 02/01/01 12:01 | 02/01/01 12:01 | 02/01/01 12:30 | 02/01/01 16:30 | 03/05/05 20:32 | 02/04/20 08:15 | 02/04/20 08:30 | 03/12/02 11:03 |
| IMAGE FORMAT | JPG (COMPRESSION) | JPG (COMPRESSION) | JPG (COMPRESSION) | RAW (NON-COMPRESSION) | RAW (NON-COMPRESSION) | RAW (NON-COMPRESSION) | RAW (NON-COMPRESSION) | JPG (COMPRESSION) | ...... |
| PHOTOGRAPHING DEVICE TYPE | A | A | A | A | A | B | B | C | ...... |
| RECORDING POSITION INFORMATION | xxx01 | xxx02 | xxx03 | xxx04 | xxx05 | xxx06 | xxx07 | xxx08 | ...... |
| FILE NAME | 001.jpg | 002.jpg | 003.jpg | 004.brf | 005.brf | 006.brf | 007.brf | 008.jpg | ...... |

| TYPE | STROBE | MULTI-POINT AF | AUDIO RECORDING | CCD | COMPRESSION/ NON-COMPRESSION | COMMENT INPUT | MONO-CHROME | SEPIA | STITCH ASSIST MODE | CONTINUOUS PHOTOGRAPH | LENS DISTORTION | PHOTOMETRY VALUE OF EACH BLOCK |
|---|---|---|---|---|---|---|---|---|---|---|---|---|
| A | 1 | 1 | 1 | PRIMARY COLOR | 1 | 1 | 1 | 1 | 0 | 1 | LENS CHANGEABLE | 1 |
| B | 1 | 1 | 1 | PRIMARY COLOR | 1 | 1 | 0 | 0 | 0 | 1 | LENS CHANGEABLE | 1 |
| C | 1 | 0 | 1 | PRIMARY COLOR | 1 | 1 | 0 | 0 | 1 | 0 | 0 | 0 |
| D | 1 | 0 | 0 | PRIMARY COLOR | 1 | 0 | 1 | 1 | 1 | 0 | 1 | 0 |
| E | 0 | 0 | 0 | COMPLEMENTARY COLOR | 0 | 0 | 1 | 1 | 0 | 0 | 1 | 0 |
| ----- | ----- | ----- | ----- | ----- | ----- | ----- | ----- | ----- | ----- | ----- | ----- | ----- |

FIG. 8

IMAGE PROCESSING APPARATUS WITH ATTRIBUTION FILE CONTAINING ATTRIBUTION INFORMATION OF A PLURALITY OF IMAGE FILES

BACKGROUND OF THE INVENTION

1. Field of the Invention

The present invention relates to an image processing apparatus that can increase the operating speeds of image data retrieval processing, image processing or the like.

2. Related Background Art

Dramatic advances have been made in the development of image recording apparatuses, such as digital cameras, but especially there has been the increases in the memory capacities of recording media, such as PC cards, for use with such the apparatuses, and in the number of the image files that can be stored.

Paralleling the development of increased memory capacities, for recording media, there is expected the growth in the importance of file retrieval methods of retrieving desired image data from enormous quantities of data. The following known methods are available for retrieving files that include image data.

As a first known file retrieval method, non-image data, such as an ID, a keyword and a title, are manually entered as retrieval data for an image file, and are correlated with a recording location and an image file name to retrieve a desired image file.

As a second known file retrieval method, an image file is generated by the addition to image data of attribution data, such as the photographing date, luminance and color difference data, and property analyzation of the attribution data of the individual image files is performed so that a desired image file can be retrieved.

As a third known file retrieval method, text data included in an image file are read as a unit of a character string, and during pre-processing performed to facilitate retrieval, retrieval data are prepared by correlating the character string with data specifying a recording location within the image file. Then, while retrieval is in progress, by referring to the retrieval data prepared during the pre-processing, the character string is used to identify a desired file.

However, according to the first file retrieval method, the need to manually add a keyword imposes a load on a user, and from this a usability problem has arisen. According to the second file retrieval method, when there is an enormous number and variety of image files, an extended period of time is required to retrieve image data that match a specific condition, and the user must wait a long time for the display processing of image data to be terminated. And according to the third file retrieval method, a process for preparing retrieval data is required, and this pre-processing takes time.

Judging from recent trends, image recording apparatuses are diversified in accordance with their intended purposes, such as the provision of a type that supplies high image quality and superior color reproduction, of a type that, while taking portability into account, includes only the minimum required functions, and of a type offering higher performance, including the provision of a special effect such as sepia photography or the provision of an enhanced photographic function such as multi-point autofocusing.

As the image recording apparatuses are diversified, the functions of data processing apparatuses, e.g., personal computers (PCs), which read and process image data recorded on a storage medium by the image recording apparatus, also tend to be diversified.

When the functions of a data processing apparatus are diversified, accordingly, there is an increase in the number of operating members and operating commands, and the operating method becomes complicated. However, when an image file stored by the image recording apparatus is to be processed, unwanted operations, commands and functions occur, depending on the conditions under which the image file was recorded.

For example, even when the functions provided for a data processing apparatus include one for reddishness prevention, this function is not required when an image file is recorded without using a strobe, or when an image file is recorded by an image recording apparatus that does not have a strobe function. When functions and commands not required for the performance or the operating mode of the image recording apparatus are displayed as though they could be employed, usability is deteriorated, and time is required for mode setting and function selection. As a result, an erroneous operation will occur.

SUMMARY OF THE INVENTION

To overcome the above problems, it is one objective of the present invention to provide an image processing apparatus that can eliminate the labor required to enter a keyword for retrieving image data, and that can reduce the time needed to prepare retrieval data.

It is another objective of the present invention to provide an image recording apparatus that, in accordance with attribution data provided for image data, can change a user interface and can prevent an erroneous user operation and the deterioration of usability, and that can easily perform the processing of desired image data; a data processing apparatus and system and a data processing method therefor; and a storage medium and a program therefor.

To achieve these objectives, according to one aspect of the present invention, an image processing apparatus comprises:

image acquisition means for acquiring images;

first file generation means for generating a first file including image data output by the image acquisition means and attribution data prepared for the image data; and second file generation means for generating a second file in which the attribution data are recorded together with other attribution data.

Further, according to another aspect of the present invention, an image processing apparatus comprises:

file acquisition means for obtaining first files in which attribution data of each image data are recorded; and data processing means for changing a process and a display form of each image data based on the corresponding attribution data in the first file.

Furthermore, according to a still another aspect of the present invention, an image processing method comprises:

a first step of obtaining first files in which attribution data of each image data are recorded; and a second step of changing a process and a display form of each image data based on the corresponding attribution data in the first file.

According to further aspect of the invention an image recording apparatus comprises:

image pickup means for capturing an object image to obtain image data;

image file generation means for generating an image file storing the image data obtained from said image pickup means; and attribution file generating means for obtaining attribution information for operation of said image pickup means, preformed to obtain the image data therefrom, and generating an attribution file including the attribution information of a plurality of image data stored in a plurality of image files generated by said image file generation means.

According to yet another aspect of the invention an image recording method comprises:

capturing an object image with image pickup means to obtain image data therefrom;

generating an image file storing the image data obtained from said image pickup means in said image capturing step; and generating means for obtaining attribution information for operation of said image pickup means, preformed to obtain the image data therefrom, and generating an attribution file including the attribution information of a plurality of image data stored in a plurality of image files generated in said image file generating step.

According to yet an additional aspect of the invention an information processing apparatus comprises:

a file obtaining unit for obtaining an image file and an attribution information file from a recording medium which records thereon an image file storing image data obtained from image capture apparatus, and the attribution information file including attribution information indicating settings which the image capture apparatus had when the image apparatus obtained the respective image data stored in the plurality of the image files;

a discrimination unit, which discriminates the image data corresponding to the attribution information designated based on the attribution information file;

a control unit, which controls the file obtaining unit so as to obtain the image file which stores the image data corresponding to the attribution information designated by the discrimination unit; and a display unit, which causes a display apparatus to display an image associated with the image file read out by the file obtaining unit.

According to another aspect of the invention an information processing method comprises:

obtaining an image file and an attribution information file from a recording medium which records thereon an image file storing image data obtained from image capture apparatus, and the attribution information file including attribution information indicating settings which the image capture apparatus had when the image capture apparatus obtained the respective image data stored in a plurality of the image files;

discriminating the image data corresponding to the attribution information designated based on the attribution information file;

controlling the file obtaining step so as to obtain the image file which stores the image data corresponding to the attribution information designated in the discrimination step; and controlling to cause a display apparatus to display an image associated with the image file read out in the file obtaining step.

The information processing method can be executed by a computer, wherein a computer readable storage medium stores a computer-executable program comprising code for cause the computer to execute the information processing method.

The other objectives and features of the present invention will become obvious during the presentation of the following explanation, given while referring to the accompanying drawings.

DETAILED DESCRIPTION OF THE PREFERRED EMBODIMENTS

The preferred embodiments of the invention will now be described in detail while referring to the accompanying drawings.

First Embodiment

Figure 1:
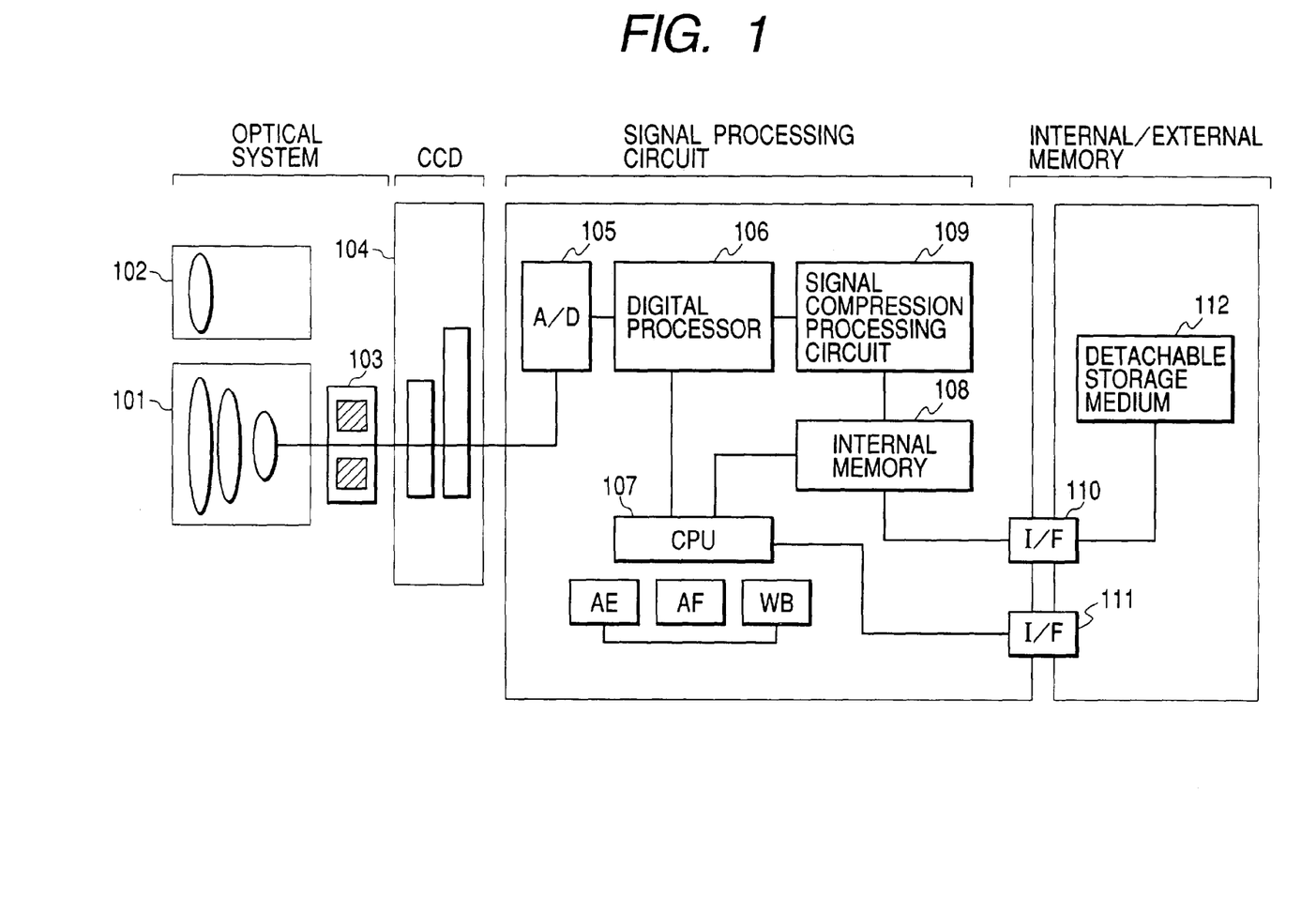
FIG. 1 is a schematic block diagram showing the configuration of an image processing apparatus according to a first embodiment of the present invention.

In the following explanation, retrieval data is referred to as an image data list. FIG. 1 is a block diagram showing the configuration of a digital camera according to the present invention. In FIG. 1, the digital camera comprises: a camera lens 101; a viewfinder 102; a shutter/aperture 103; a photoelectric converter (hereinafter referred to as a CCD) 104, for converting into an electric signal the image of an object formed by an optical system that includes the camera lens 101 and the shutter/aperture 103; an analog/digital converter 105, for converting the output of the CCD 104 into a digital signal; a digital processor 106, for performing predetermined camera signal processing, such as the generation of a luminance signal and a color signal relative to the digital signal obtained by the analog/digital converter 105; a CPU 107, for controlling various camera processes, such as AE, AF and WB, and signal processing; and an internal read/write memory 108, used for the temporary storage of various signals when they are processed by the CPU 107.

A signal compression processing circuit 109 performs image compression, such as JPEG, of an image signal obtained by the digital processor 106 through predetermined image processing. An interface 110, for the reading and writing of data, is connected to a detachable storage medium 112, a detachable memory card. And an interface 111 is used for a connection to a personal computer.

Figure 2:
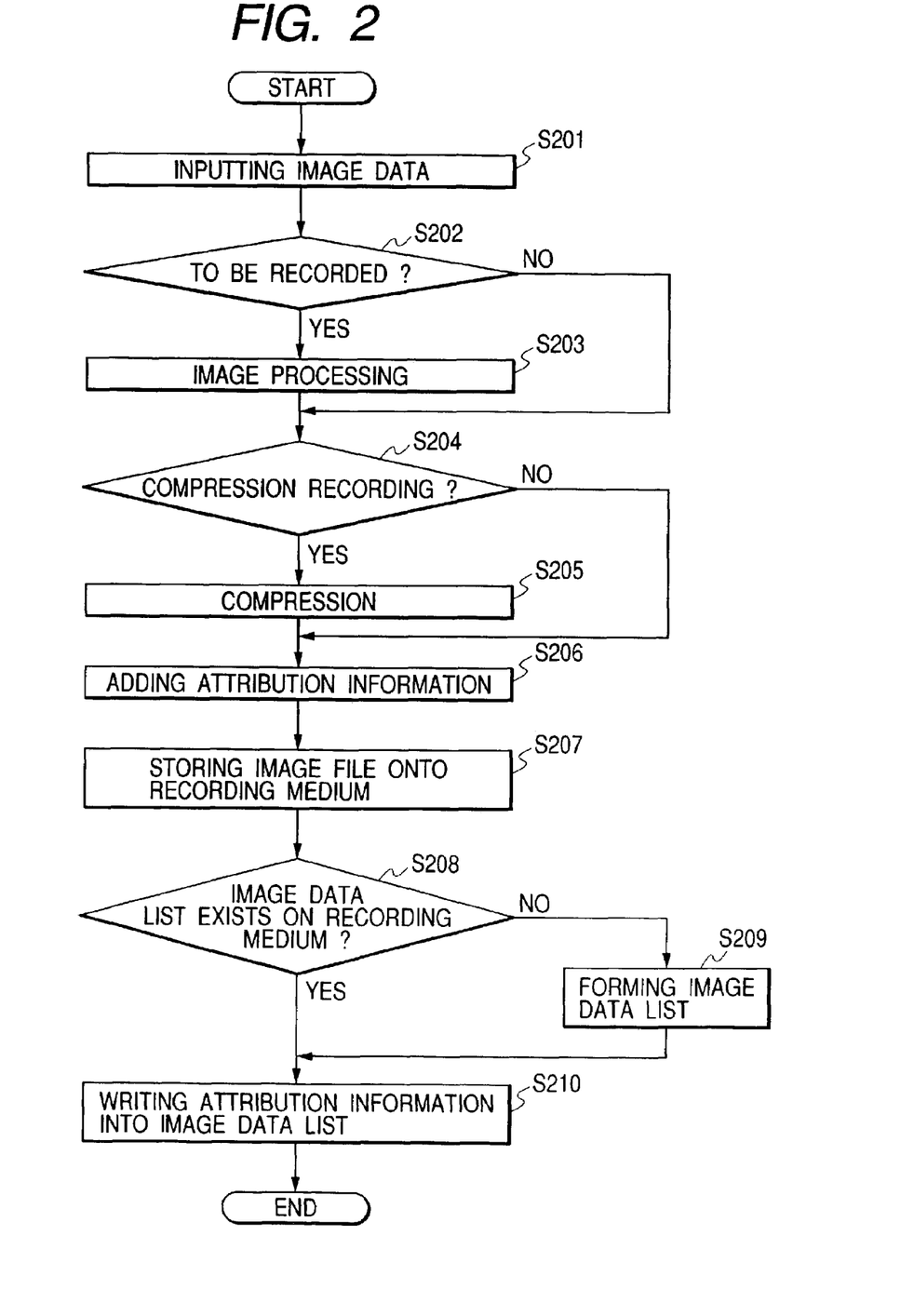
FIG. 2 is a flowchart showing the processing performed to prepare an image data list according to the first embodiment of the present invention.

FIG. 2 is a flowchart showing the image data list preparation processing, which is a processing sequence performed by a digital still camera for displaying a type list.

At step S201, the CCD 104 converts into an electric signal an optical image formed on the image pickup plane through the camera lens 101, and the analog/digital converter 105 converts the received signal into a digital signal. The digital processor 106, which handles digital signals, performs predetermined camera signal processing on the digital signal, and the signal compression processing circuit 109 uses JPEG to compress the obtained signal, and thereafter stores the compressed signal in the internal memory 108.

At step S202, a check is performed to determine (select) whether the image data stored in the internal memory 108 at step S201 should be recorded in the storage medium 112. For this embodiment, a recording mode can also be determined (selected). For example, a check can be performed to determine whether the thus obtained image data are to be recorded in the JPEG compression mode, or whether the data output by the CCD 104 are to be recorded in the RAW mode without being changed by the photographer who is going on taking photographs.

At step S203, the image processing is performed in accordance with the selected recording mode. In this embodiment, the image processing includes a filtering process and a color adjustment process based on white balance data and auto focusing data.

At step S204, for the image data thus obtained and stored in the internal memory 108, a check is performed to determine whether compression recording should be performed. In this embodiment, this determination depends on whether the photographer selects the compression recording mode at the time the photograph was taken.

When at step S204 it is determine that the compression recording mode is selected, at step S205 the signal compression processing circuit 108 performs a compression process, such as JPEG. When the compression recording mode is not selected at step S204, program control skips step S205 and go to step S206.

At step S206, attribution data are added to the image data. In this case, the attribution data are data for photographic conditions, such as a photography date, a photographic device type, the ON/OFF state of a strobe, and a recording form.

At step S207, image data to which the attribution data are added are stored in an image file form on the storage medium 112, such as a memory card. At step S208, a check is performed to determine whether an image list representing retrieval data is present in the storage medium 112. Further, in this embodiment, the storage medium 112 is a detachable storage medium, such as a compact flash memory (R), and the image data list is a text file wherein the attribution data of at least one image is recorded as a list in a text form.

When at step S208 the image data list is formed in the storage medium 112, program control advances to step S210 to write the attribution data of the image data in the image data list. When at step S208 an image data list is not present in the storage medium 112, program control advances to step S209 and the image data list is prepared to write thereinto the attribution data of the image file recorded in the storage medium 112. Program control then advances to step S210, and the attribution data of the recorded image data are written to the image data list.

That is, when the image data list is formed :at step S209, at step S210 text data is written to the new data list. When the process at step S210 is performed after step S208, data is added at the end of the image data list that has already been prepared.

Figure 3:
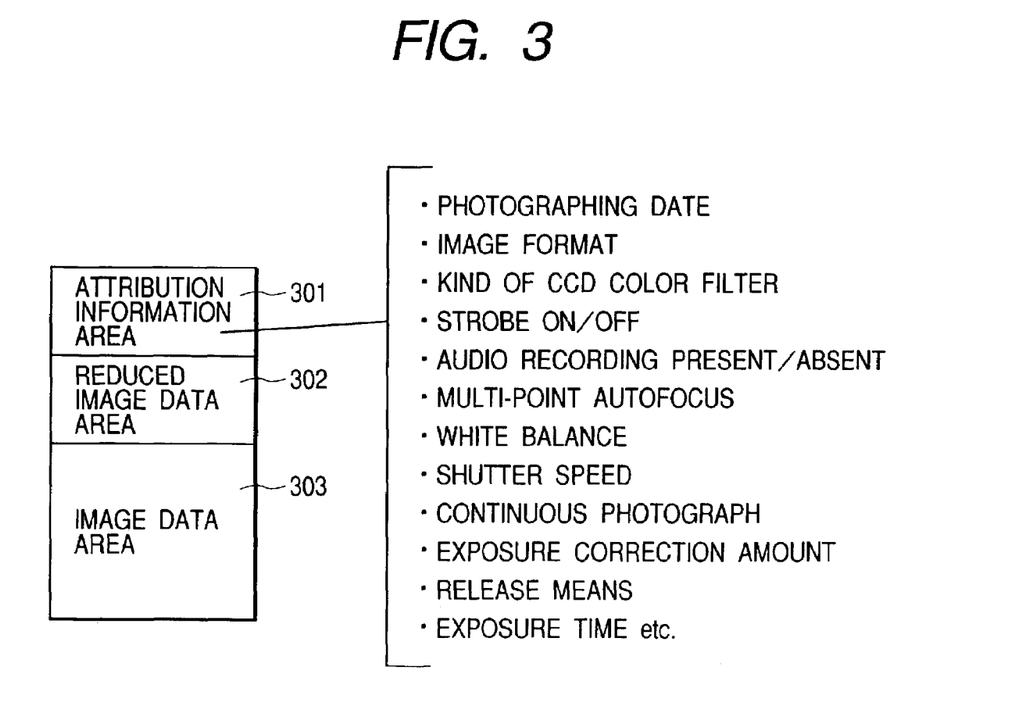
FIG. 3 is a conceptual diagram showing an image file according to the first embodiment of the present invention.

FIG. 3 is a schematic diagram showing the structure of the format of an image file generated by the image processing apparatus according to this embodiment. In FIG. 3, an image attribution data area 301 is used to store photographic data, such as an image data size, a photographic date, a photographic device type, a compression method, the ON/OFF state of a strobe and CCD filter data, and data required for reading, reproducing and selecting an image. A reduced image data area 302 is used to store so-called thumbnail images, and reduced image data that are to be displayed as a list by a personal computer, which is an external apparatus, are sequentially stored in this area 302. An image data area 303 is used to sequentially store all the image data that should be stored as image files.

Figure 4:
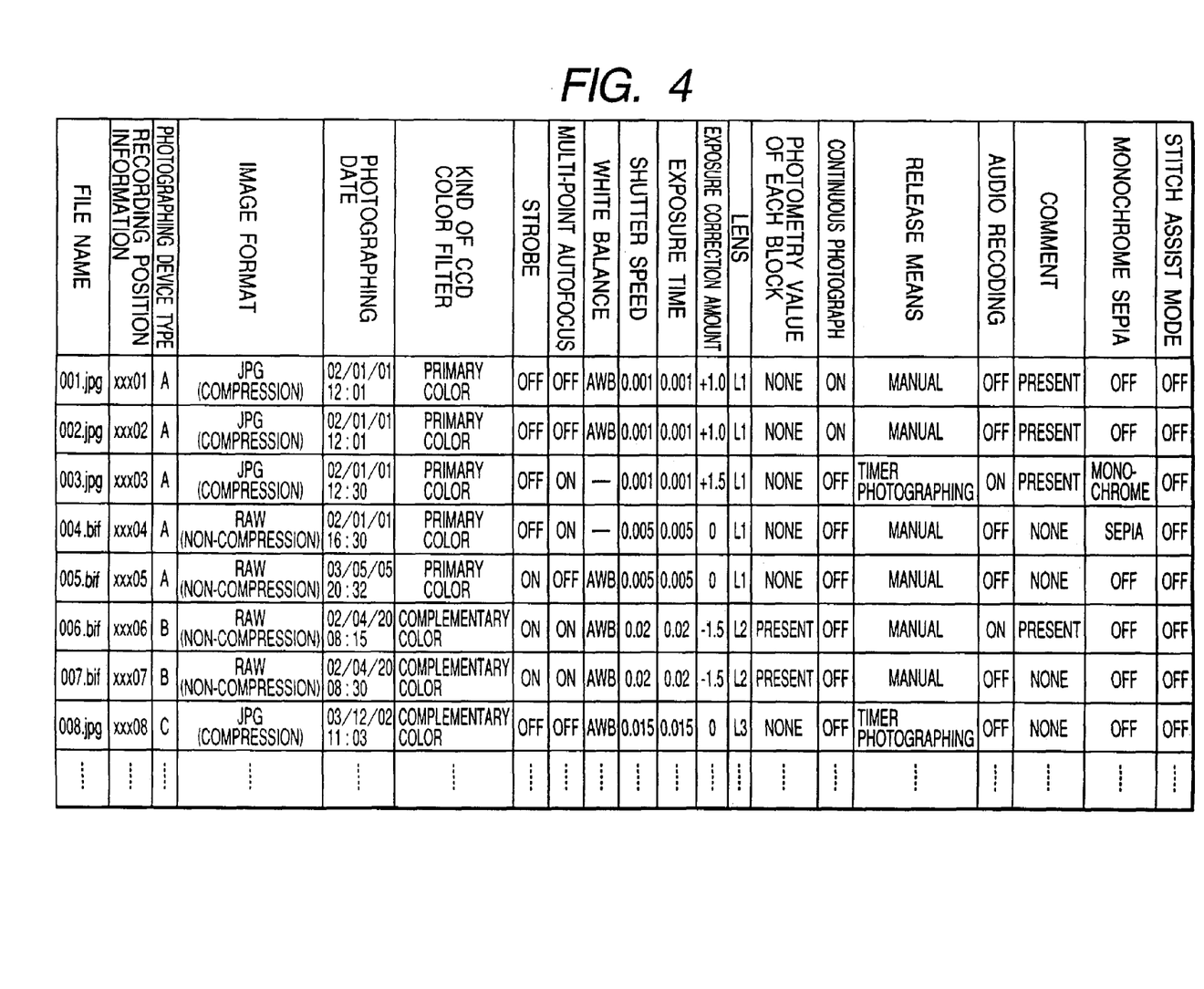
FIG. 4 is a conceptual diagram showing an image data list according to the first embodiment of the present invention.

FIG. 4 is a diagram showing a table representing the contents of the image data list prepared by the image processing apparatus according to the embodiment. The image data list includes: data representing a digital still camera type; data representing a part of the digital still camera, e.g., data representing a lens type or a CCD type; data representing a characteristic of the optical device of the digital still camera, e.g., data representing distortion characteristics of a lens, color filter characteristics and the like; data representing an operation status of the optical device, e.g., data representing a focusing condition, an exposure time or an exposure correction operation; data representing an image acquisition method, i.e., an image photographic method, e.g., strobe photography, multi-point autofocus photography, continuous photography, monochrome mode photography, sepia mode photography, image synthesis auxiliary mode photography, timed photography; an image processing method of image data, e.g., data indicating whether image data are compressed data, whether image data has been generated by converting an optical image into an electric signal and then converting the electric signal into digital data, whether the photometric value, which is obtained for each block of image data and is used as a reference for photometry evaluation, is recorded together with the image data, whether a character input area is present in the image data, whether audio data have been added to the image data, or whether white balance has been corrected for the image data; data indicating the operating condition of the mechanical system of the digital still camera, e.g., data indicating a shutter speed or a release means; data indicating the date whereat the image was obtained (photographed); data indicating the file name to be added to the image data; and data indicating the location whereat the image data are recorded on the storage medium 112.

That is, the file name, the recording location data, the image format, the photography date, the CCD color filter type, the ON/OFF data as related to strobe photography, the multi-point autofocusing mode photography, auto white balance photography, continuous photography, ON/OFF data of monochrome mode photography, sepia mode photography and image synthesis auxiliary mode photography, the shutter speed, the exposure time, the exposure correction data, the lens type data, the presence/absence of the photometric value that is obtained for each block and is used as a reference for photometry evaluation, the release means, and the presence/absence of audio recording are stored as text data in the image data list.

The processing steps for photographing images using a digital still camera, the preparation of an image file and the writing of attribution data to the image data list will now be described while referring to the block diagram in FIG. 1, which shows the configuration of the digital still camera, the flowchart in FIG. 2, which lists the processing performed to generate the image data list, and the table in FIG. 3, which shows the contents of the image data list.

At a first step, the color CCD 104 converts, into an electric signal, a light signal passed through the camera lens 101, the analog/digital converter 105 converts the analog digital signal into a digital signal, and the digital signal is transmitted as image data (S207). At a second step, the digital processor 106 and the CPU 107 perform the image processing (S203) based on the white balance and the autofocus, as needed (S202). The signal compression processing circuit 109 compresses data as needed (S204 to S205), and the CPU 107 once again adds attribution data, such as the photographic date, the photographic device type, and the ON/OFF states of the strobe and the recording form (S206). Then, the image data are transmitted through the interface 110 and are stored as an image file on the storage medium 112 in accordance with the image storage system shown in FIG. 3 (S207). At a third step, a check is performed to determine whether a image data list is present in the detachable storage medium 112, such as a compact flash memory (R) (S208). When an image data list is not present, an image data list is prepared (S209), and the attribution data of the image file stored at the second step are written therein (S210).

The steps for displaying a list of the individual types will now be described while referring to the flowchart in FIG. 5 for an example wherein, to communicate with a personal computer, the storage medium can be loaded into a storage medium reader, such as a PC card reader, and wherein at least one image file and an image data list are present in the storage medium as a result of the above described steps.

The personal computer receives the type of digital still camera entered by the user (S501), and then obtains the image data list from the compact flash memory (R) that is loaded in a storage medium reader, such as a PC card reader (S502), and a variable i is initialized to 0 (S503). The variable i is a counter for counting the number of image files obtained through the processes at S505 to S509. When the count value of the counter i is smaller than the number of image files recorded in the image data list, a check is performed to determine whether a loop condition is established wherein the processes from S505 to S509 are repeated (S504).

Following this, the personal computer reads the attribution data concerning the i-th image on the image data list (S505), and determines whether the photographic device type including the attribution data is the same as the type entered by the user (S506). When the two types match, the pertinent image file for the attribution data is read from the storage medium 112 (S507), and the reduced image data are displayed (S508).

Then, the count value held by the counter i is incremented by one (S509), and the processes from S505 to S509 are repeated the number of times that corresponds to the count of the image files stored on the image data list. When the loop condition is false, program control exits the loop (S504). Through these steps, the image data obtained for the photographic device type entered by the user are displayed as a list.

The list of types designated by the user is displayed. However, by using same method, various photographic conditions, such as the image format, the photography date, the CCD color filter type, the ON/OFF state of a strobe, the multi-point autofocusing, the white balance, the shutter speed, the exposure time, the exposure correction amount, the lens type, the photometric value for each block, the continuous photography, the release means, the presence/absence of audio recording, the presence/absence of a comment, the monochrome/sepia mode and the stitch assist mode can be displayed as a list.

Figure 5:
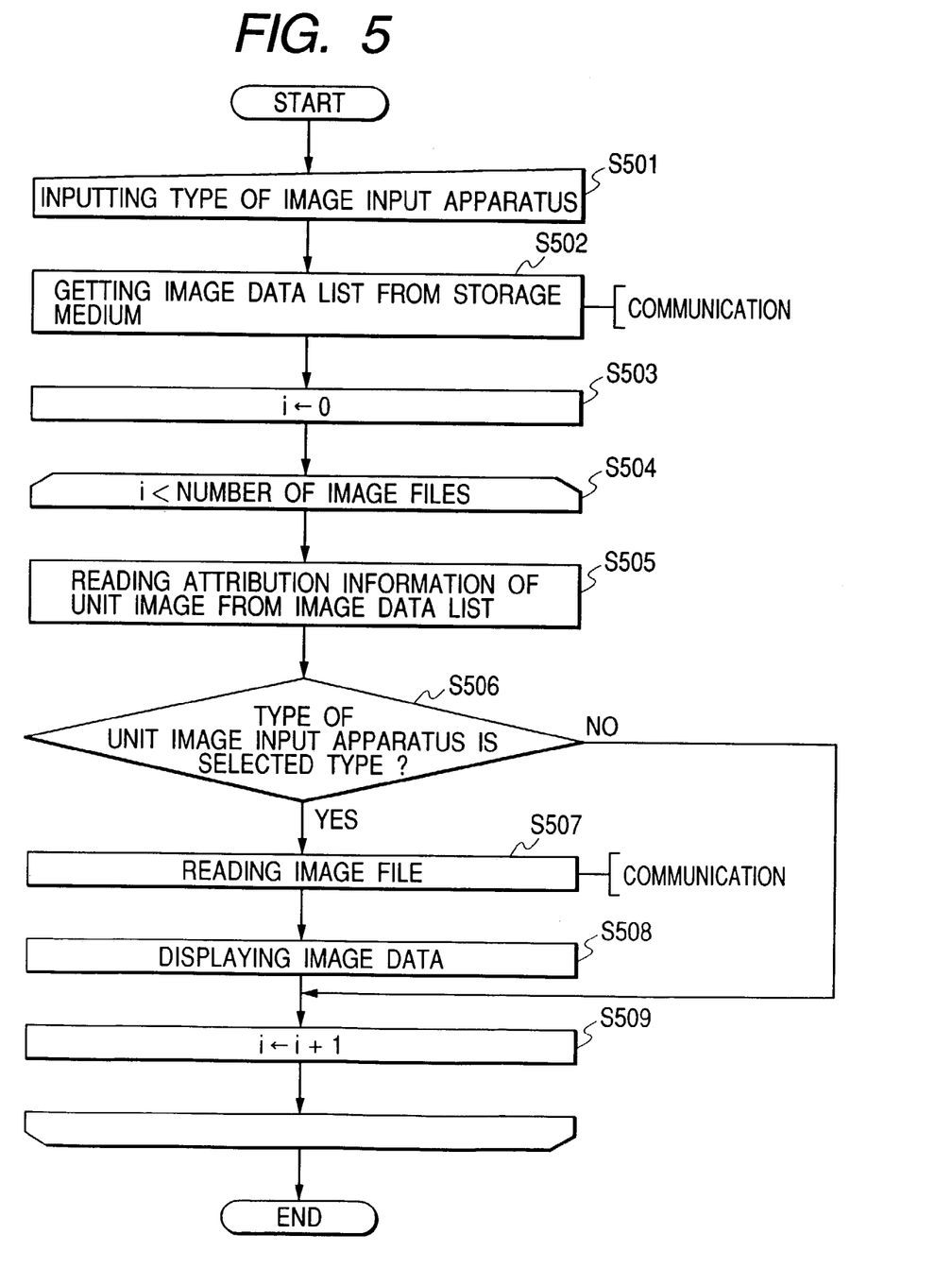
FIG. 5 is a flowchart showing the operation performed by the image processing apparatus according to the first embodiment of the present invention.

Further, in the explanation at S502 in FIG. 5, the PC card reader is employed as an example image data reader; however, the same operation can be performed for a case wherein a digital camera, into which a detachable storage medium is loaded, is connected to a computer by a cable.

Further, in this embodiment, the list of reduced image data is displayed; however, the same method can be employed to reproduce image data for the image data preview display and for an enlarged/reduced image data display.

As is described above, according to the first embodiment, the labor required for entering retrieval data, such as a keyword, can be eliminated, and the time required for the generation of retrieval data, which helps to increase the retrieval speed, can be reduced. Furthermore, a desired image that matches a condition can be retrieved and displayed at high speed.

Second Embodiment

A second embodiment of the present invention will now be described in detail. Since for this embodiment the configuration of a digital camera and the operations performed to prepare image files of photographed images and to write attribution information in an image data list are the same as those shown in FIGS. 1, 2 and 4, no further explanation for them will be given.

The user interface switching operation for an image processing apparatus according to the embodiment will now be described while referring to the flowchart in FIG. 6. This switching operation is performed based on a condition wherein which images are entered in the image processing apparatus, i.e., based on attribution information of the image processing apparatus at a time when the photograph is taken.

A personal computer obtains an image data list from a storage medium, such as a compact flash memory (R) that is inserted into a storage medium reader, such as a PC card reader (S601), and initializes a variable i to 0 (S602). The variable i is a counter for counting the image files obtained as a result of the processes performed from steps S604 to S611. When the value held by the counter i is greater than the number of image files that are recorded on the image data list and are displayed, a check is performed to determine whether a loop condition is established wherein the processes from step S604 to step S611 are repeated (S603).

Next, the personal computer reads, from the image data list, attribution information concerning the i-th image that is currently displayed (S604), and determines whether the i-th image was photographed by using the strobe (S605). When the strobe was employed, the personal computer turns on a reddishness relaxation processing button display flag (S606). Then, in the same manner as at steps S605 and S606 when the multi-point autofocusing function was employed for photographing, the personal computer turns on an in-focus button display flag (S608). When the audio recording function was employed for photographing (S609), the personal computer turns on an audio reproduction display button (S610), and then, the counter value i is incremented by one (S611).

The personal computer repeats the processes from steps S604 to S611 a number of times corresponding to the count of the images that are recorded on the image data list and are displayed. When the loop condition is false, program control exits the loop (S603). Then, in accordance with all the button display flags, a button for which the flag is on is displayed, while a button for which the flag is not on is not displayed, and the user interface is displayed (S612). Thus, when at step S612 the reddishness relaxation processing button display flag and the in-focus button display flag are on and the audio reproduction button display flag is not on, the reddishness relaxation processing button and the in-focus button are displayed, while the audio reproduction button is not.

Figure 6:
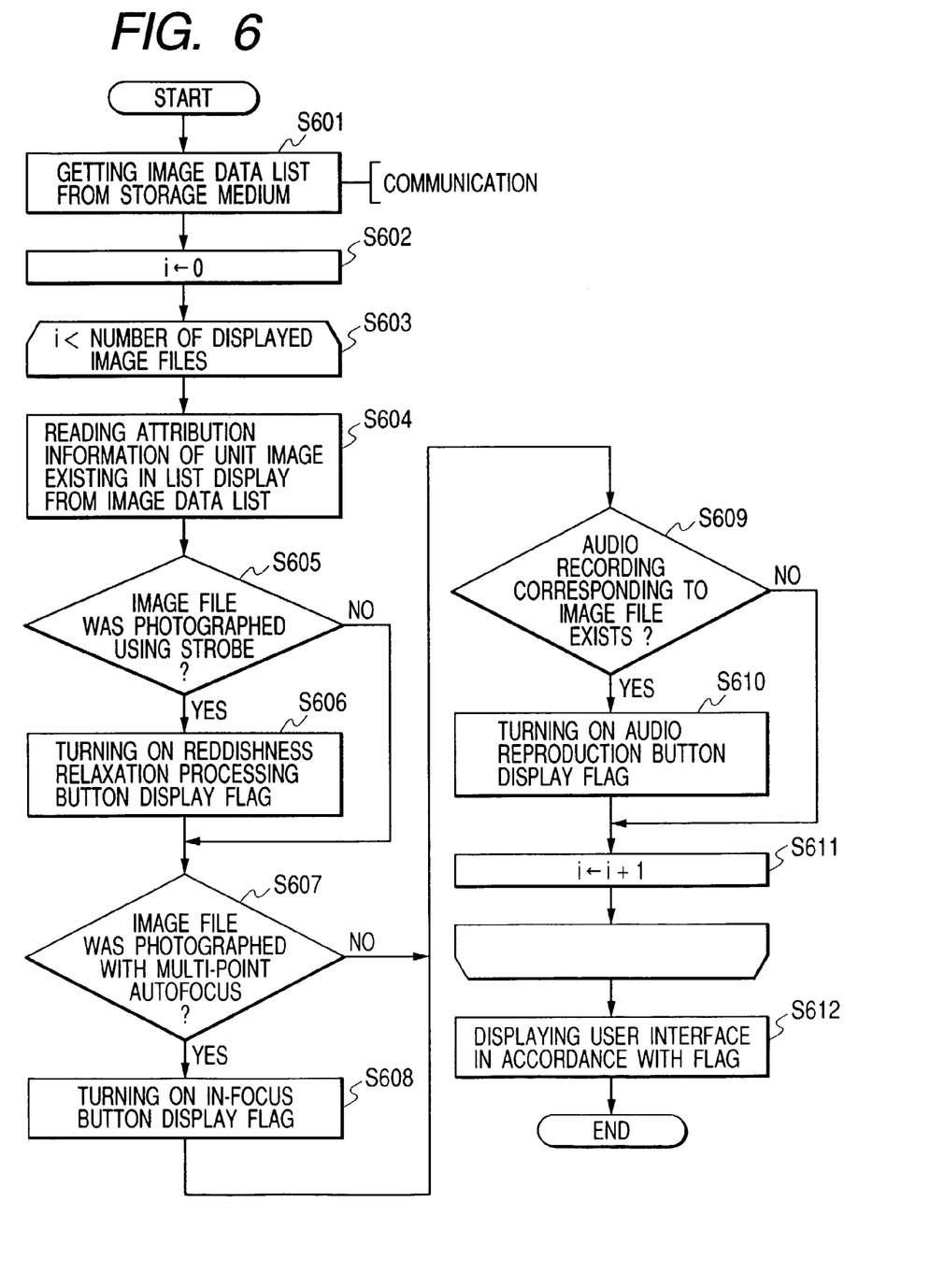
FIG. 6 is a flowchart showing the operation performed by an image processing apparatus according to a second embodiment of the present invention.

In the processing in FIG. 6, even when only one image file photographed using multi-point autofocusing is present among 1000 image files displayed through the image processing, the in-focus button is displayed.

In this processing, the turning on or off of the strobe, the enabling and disabling of the usage of the audio recording function, and the enabling and disabling of the usage of the multi-point autofocusing function is employed to explain the process for the switching of the user interface by the personal computer. However, since the enabled or necessary process and the disabled or unnecessary process differ, depending on the photographic conditions, the user interface can be switched using the same method. For example, when there is a file wherein character data can not be entered, i.e., no area is available for the entry of character data in an image file, the character data input process is disabled, and accordingly a character data input operating member is not required.

The operating members applicable for the present invention include those for performing: reddishness relaxation processing, audio reproduction processing, in-focus display processing, character data input processing, monochrome conversion processing, color adjustment processing, sepia conversion processing, sepia color adjustment processing, image synthesis processing, a frame-feeding reproduction process, white balance adjustment processing, contrast adjustment processing, color density adjustment processing, tone curve adjustment processing, color matrix adjustment processing, sharpness adjustment processing, exposure correction processing, lens distortion adjustment processing, exposure level adjustment processing, list display processing, and image compression processing.

For an image file obtained in the monochrome mode, the monochrome conversion processing and the color adjustment processing, and the operating members therefor are not required. For an image file obtained in the sepia mode, the sepia color adjustment processing and the operating member therefor are required, while the sepia conversion processing and the operating member therefor are not required. For am image file obtained in the image synthesis auxiliary mode, the image synthesis processing and the operating member therefor are required, while for an image file not obtained in the image synthesis auxiliary mode, these processing and operating members are not required. It should be noted that the image synthesis auxiliary mode is a photographic method (panoramic photography) used when an object that does not fit in a viewfinder is photographed segmentally while the digital still camera is moved horizontally, vertically and clockwise, and the segments thereby obtained are synthesized using the image processing apparatus.

For an image file obtained using continuous photography, frame-feeding reproduction processing, wherein an image file obtained during continuous photography is displayed by feeding individual frames, the image processing and the operating member therefor are required, while for an image file that is not obtained using continuous photography, the image processing and the operating member are not required. When an image file is processed by the image input apparatus (S203) and the compressed image file is recorded (S204), various image processes that can be performed only for an unprocessed, non-compressed image and the operating members therefor, such as those for white balance adjustment, contrast adjustment, color density adjustment, tone curve adjustment, color matrix adjustment, sharpness adjustment and digital exposure correction, and compression recording processing and the operating member therefor are not required.

For an image file obtained using a lens that provides a distorted image, lens distortion adjustment processing and the operating member therefor are required, while for an image file not using this lens, this processing and the operating member are not required. For an image file for which a photometry value is recorded for each block that is a reference for photometry evaluation, the exposure level adjustment processing using evaluation photometry and the operating member therefor are required, while for other image files these are not required. As is described above, since the enabled or required process and the disabled or not required process differ depending on various photographing conditions, the user interface can be changed in the same manner as in the operation in the second embodiment. It should be noted that the operating members are buttons, input boxes, menu bars, icons and tabs.

For example, when the attribution information represents the lens distortion characteristic, the display/non-display can be changed for the operating member for performing the lens distortion adjustment processing. When the attribution information represents strobe photography, the display/non-display can be changed for the operating member for performing reddishness relaxation processing. When the attribution information represents multi-point autofocusing, the display/non-display can be changed for the operating member for performing in-focus display processing. When the attribution information represents continuous photography, the display/non-display can be changed for the operating member for performing the frame-feeding reproduction processing. When the attribution information represents monochrome mode photography, the display/non-display can be changed for the operating member for performing at least one of monochrome conversion processing and color adjustment processing. When the attribution information represents sepia mode photography, the display/non-display can be changed for the operating member for performing at least one of sepia color adjustment processing and sepia conversion processing. When the attribution information represents image synthesis auxiliary mode photography, the display/non-display can be changed for the operating member for performing image synthesis processing. When the attribution information represents the image processing method employed by the digital still camera, the display/non-display can be changed for the operating member for performing at least one of white balance adjustment processing, contrast adjustment processing, color density adjustment processing, tone curve adjustment processing, color matrix adjustment processing, sharpness adjustment processing, digital exposure correction processing, compression recording processing, exposure level adjustment processing, character data input processing and list display processing. When the attribution information indicates whether or not the image data are compressed data, the display/non-display can be changed for the operating member for performing compression recording processing. When the attribution information indicates whether or not the image data is generated by converting an optical image into an electric signal and by converting the electric signal into digital data, the display/non-display can be changed for the operating member for performing at least one of white balance adjustment processing, contrast adjustment processing, color density adjustment processing, tone curve adjustment processing, color matrix adjustment processing, sharpness adjustment processing and digital exposure correction processing. When the attribution information indicates that the photometry value for each block of image data is recorded together with the image data, the display/non-display can be changed for the operating member for performing exposure level adjustment processing. When the attribution information indicates whether or not there is a character data input area in the image data, the display/non-display can be changed for the operating member for performing character data input processing. And when the attribution information indicates whether or not audio data is added to the image data, the display/non-display can be changed for the operating member for performing audio reproduction processing.

In the second embodiment, the attribution information of an image that is recorded in the image data list of the storage medium and that is currently displayed is employed as a determination element. However, when the attribution information for all the images that are recorded in the image data list are employed as a determination element, the user interface can also be switched in the same manner. For example, when the image recording form, e.g., the image format, is the same for all the image files on the storage medium, the list display switching processing using the image format and the operating member therefor are not required. Therefore, the display/non-display for the list display switching processing and the operating member therefor can be changed by the personal computer.

Furthermore, in the second embodiment, the display/non-display for the operating member is changed by using the user interface; however, instead of the non-display, the display for the operating member may be grayed out, so that an erroneous operation and usability deterioration can be prevented.

In addition, in the second embodiment, to communicate with a personal computer, the storage medium is loaded into a storage medium reader, such as a PC card reader. However, to communicate with a personal computer, a storage medium may instead be loaded into an image input apparatus, and in this case, the personal computer can switch the user interface in the same manner as in the second embodiment.

Third Embodiment

Figure 7:
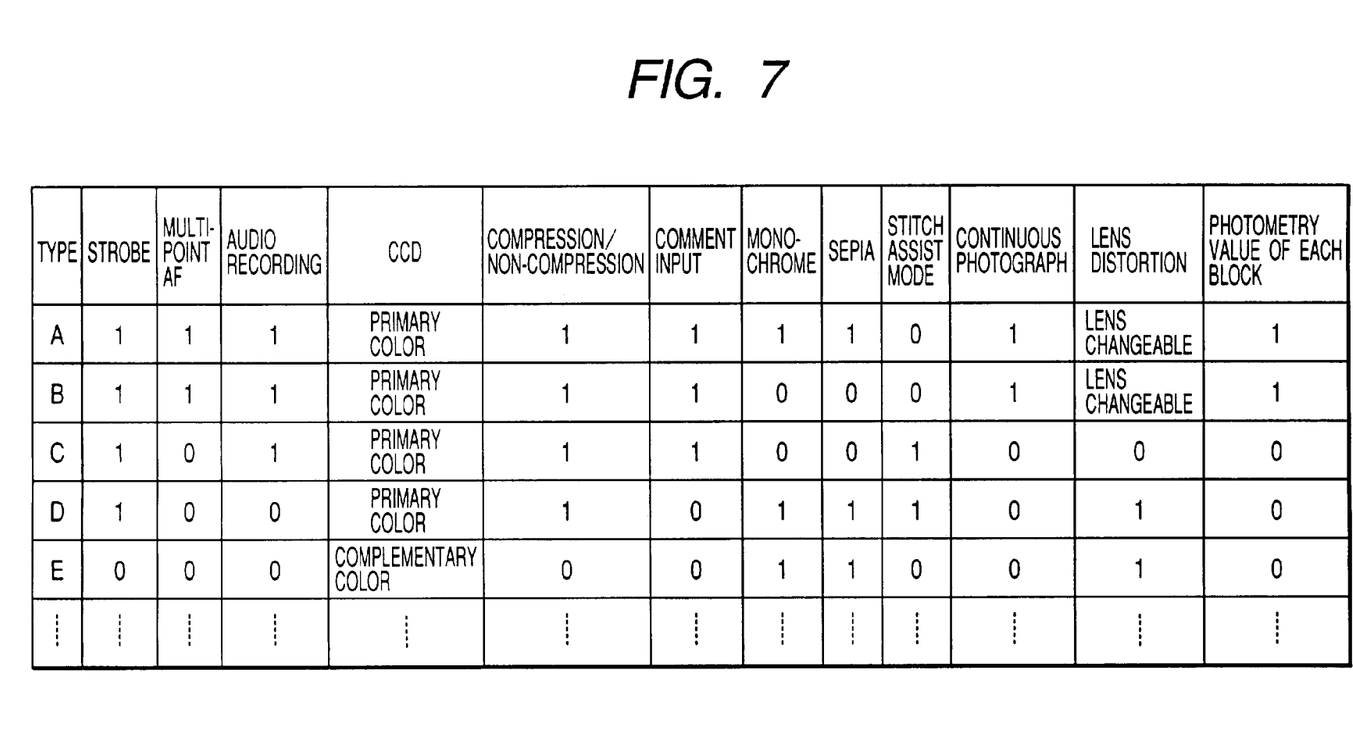
FIG. 7 is a conceptual diagram showing a function data list for individual types according to a third embodiment of the present invention.

FIG. 7 is a table showing the structure of a file in which functions (characteristic data) for each image processing apparatus type are recorded and that is used to determine the function of each type. In this embodiment, the type of an image input apparatus is the type of a digital camera, and is text data (hereinafter referred to as a function data list for each type) used for comparison with the photographic device type included in the attribution information recorded on the image data list.

Assuming that, to communicate with a personal computer, a storage medium is loaded into a storage medium reader, such as a PC card reader, and that, as well as in the first embodiment and the second embodiment, there are at least one image file and an image data list present on the storage medium, an explanation will be given, while referring to the flowchart in FIG. 8, for the operation of the personal computer for switching a user interface for each type of digital still camera.

A personal computer obtains an image data list from a storage medium, such as a compact flash memory (R), that is inserted into a storage medium reader, such as a PC card reader (S801). Then, the personal computer reads a function data list for each type of a device (S802), and initializes a variable i to 0 (S803).

The variable i is a counter for counting the image files that have been processed from steps S805 to S812. When the counter value i is smaller than the number of image files in the image data list, the personal computer determines whether a loop condition wherein the processes from steps S805 to S812 are repeated is established (S804).

Then, the personal computer reads from the image data list attribution information concerning the i-th image (S805). The personal computer compares the photographic device type included in the attribution information with the function of the photographic device type in the function data list for each type to determine whether or not the pertinent device type includes the strobe function (S806). When the photographic device type includes the strobe function, the personal computer turns on a reddishness relaxation processing button display flag (S807). In the same manner from at S806 and S807, when the photographic device type includes the multi-point autofocusing function (S808), the personal computer turns on an in-focus button display flag (S809). And when the audio recording function is included (S810), the personal computer turns on an audio reproduction button display flag (S811) and increments the counter value i by one (S812).

The personal computer repeats the processing (S805 to S812) the number of times corresponding to the count of the image files recorded on the image data list. Then, when the loop condition is false, program control exits the loop (S804), and the user interface is displayed in accordance with all the flags (S813).

Figure 8:
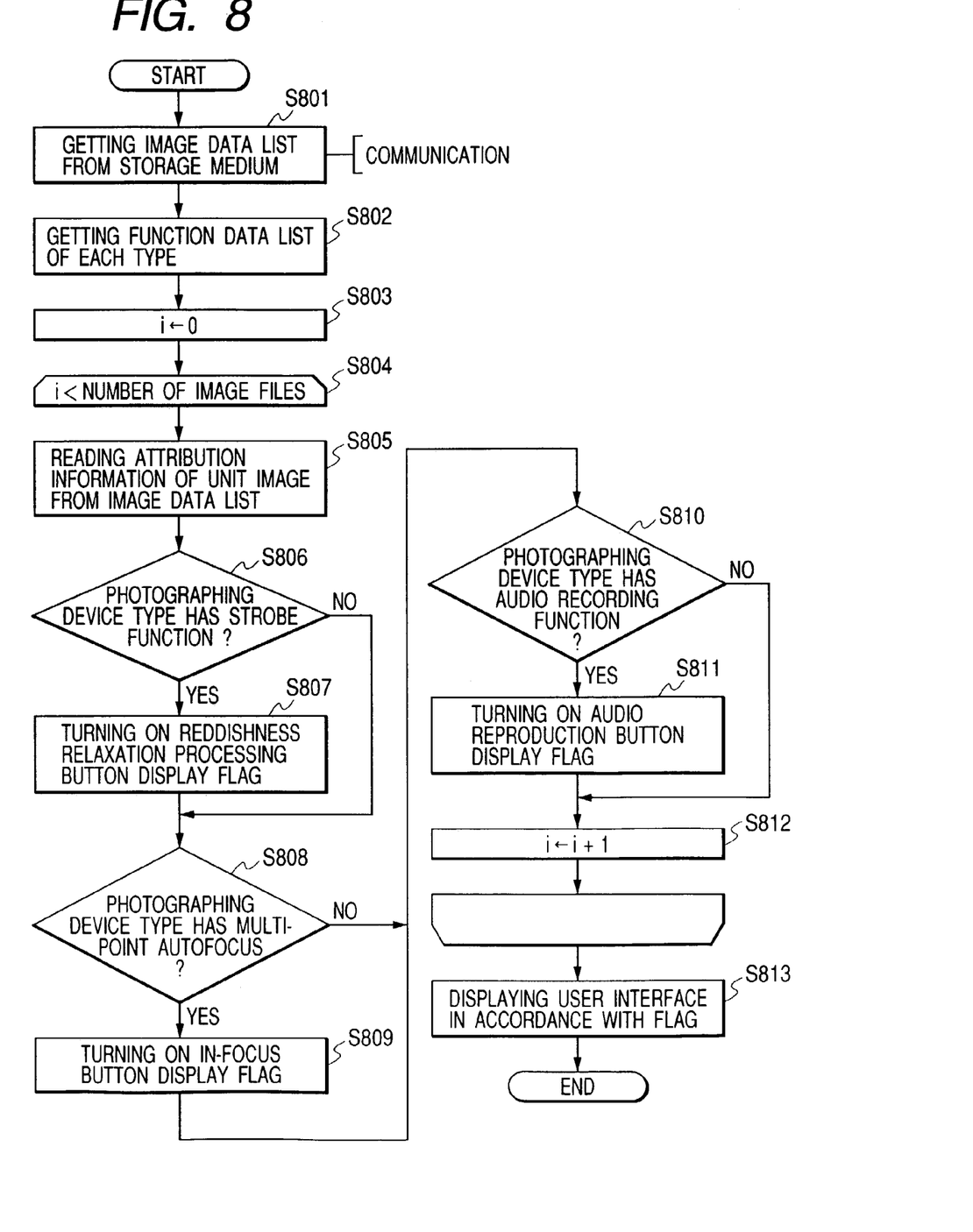
FIG. 8 is a flowchart showing the operation performed by the image processing apparatus according to the third embodiment of the present invention.

In the processing in FIG. 8, even when the multi-point autofocusing function is included in the photographic device type that is used for only one image file out of 1000 files, the in-focus button is displayed. The processing whereby the personal computer changes the user interface is explained for different image input apparatus types; however, the lens distortion correction function and the operating member therefor are required or not required depending on the lens type of the image input apparatus, such as a digital still camera. Therefore, so long as distortion data, like the data in the function data list for each type in FIG. 7, are provided for each lens type, the user interface can be switched in the same manner.

For example, when information indicating the compression recording function is present on the function data list for each type, the display/non-display can be changed for the operating member that performs the compression recording processing. When information indicating the monochrome mode photographic function is present on the function data list, the display/non-display can be changed for the operating member for performing at least one of the monochrome conversion processing and the color adjustment processing. When information indicating the sepia mode photographic function is present on the function data list, the display/non-display can be changed for the operating member for performing at least one of the sepia color adjustment processing and the sepia conversion processing. When information indicating the continuous photographic function is present on the function data list, the display/non-display can be changed for the operating member for performing the frame-feeding reproduction processing. When information indicating the image synthesis auxiliary mode photographic function is present on the function data list, the display/non-display can be changed for the operating member for performing the image synthesis processing. When information indicating the function for recording the photometry value for each block is present on the function data list, the display/non-display can be changed for the operating member for performing the exposure level adjustment processing. When information indicating the function for recording image data in an available character input area is present on the function data list, the display/non-display can be changed for the operating member for performing the character input processing. When on the function data list there is information indicating the presence of the unprocessed image recording function for recording unchanged, as RAW data, a pickup signal that is output by an image pickup device, the display/non-display can be changed for the operating member for performing at least one of the white balance adjustment processing, the contrast adjustment processing, the color density adjustment processing, the tone curve adjustment processing, the color matrix adjustment processing, the sharpness adjustment processing and the digital exposure correction processing. When on the function data list there is information indicating the presence of an image recording characteristic, such as a JPEG compressed image, RAW data, a compression rate and an image size, the display/non-display can be changed for the operating member for performing the list display processing for displaying the individual images. And when information indicating the optical characteristic of an optical device is present on the function data list, the display/non-display can be changed for the operating member for performing the lens distortion adjustment processing. At this time, data corresponding to the information on the function data list for each type must be recorded on the image data list.

In the third embodiment, the display/non-display of the operating member is changed by using the interface. However, instead of the non-display, the display for the operating member may be grayed out to change the display form. By changing the display form in this manner, an erroneous operation and usability deterioration can be prevented.

Further, in the third embodiment, to communicate with a personal computer, a storage medium is loaded into a storage medium reader, such as a PC card reader. However, to communicate with the personal computer, a storage medium may instead be inserted into an image input apparatus so that the user interface can be changed in the same manner as in the second embodiment.

As is described above, according to the second embodiment and the third embodiment, since the display process is changed depending on each image recording situation (photographic condition), the images can be easily managed, an erroneous operation and useability deterioration can be prevented, and a desired process can be performed for a desired image.

Other Embodiment

The objectives of the present invention can also be achieved by a configuration wherein software program code implementing the functions of the embodiments is supplied to an apparatus or a system, and are read and executed by a computer (a CPU or an MPU) in the system.

In this case, the functions of the embodiments are provided by the software program code, and the storage medium on which program code is recorded constitutes the present invention.

The storage medium used for supplying the program code can be, for example, a flexible disk, a hard disk, an optical disk, a magneto-optical disk, a CD-ROM, a CD-R, a magnetic tape, a non-volatile memory card, or a ROM.

In addition, the present invention includes not only a configuration wherein the functions of the previous embodiments are implemented through the execution of program code read by a computer, but also, a configuration wherein part or all of the actual processing is performed by an OS (Operating System) that is run on a computer and that provides the functions described in the above embodiments.

Furthermore, with the present invention, program code read from a storage medium can be written in a memory that is mounted on a function expansion board inserted into a computer, or in a function expansion unit connected to the computer, and in consonance with instructions in the program code, a CPU mounted on the function expansion board, or in the function expansion unit, can perform part or all of the actual processing required to implement the functions of the above described embodiments.

As is apparent from the above explanation, according to the present invention, a file wherein attribution information is recorded for image data sets is automatically prepared, and the processing is performed for each image data set based on the corresponding attribution information. Therefore, the need for labor for manually registering the attribution information required for this processing is eliminated, and the preparation of a file is not required because an apparatus that performs the processing based on the attribution information can obtain the above file. Accordingly, the processing speed can be increased.

Further, attribution information corresponding to designated retrieval conditions may be extracted from the file, so that image data that matches the retrieval results can be obtained for the attribution information. Thus, as is described above, the need for labor for manually registering a retrieval keyword in advance is eliminated, and an apparatus that performs the retrieval processing need not prepare retrieval data, such as the above described file, to increase the retrieval speed. Thus, the image data retrieval process can be performed at a higher speed.

In addition, since the display process is switched in accordance with the attribution information for each image data set, an erroneous operation and usability deterioration can be prevented.

Many widely different embodiments of the present invention may be constructed without departing from the spirit and scope of the present invention. It should be understood that the present invention is not limited to the specific embodiments described in the specification, except as defined in the appended claims.

What is claimed is:

1. An information processing apparatus for reading out image data from a recording medium on which the image data is recorded by an image capture apparatus, comprising:

a file obtaining unit, which obtains, from the recording medium, an image file and an attribution information file recorded on the recording medium by said image capture apparatus, the image file and the attribution information file being independent of each other so that the image file stores image data obtained from an image capture apparatus and the attribution information file stores attribution information of respective image data stored in the plurality of recorded image files, indicating settings which the image capture apparatus had when the image capture apparatus obtained the respective image data; and a control unit, which is arranged to control said file obtaining unit so as to obtain the attribution file prior to the image file discriminate the image file which falls within a condition designated by a user among the plurality of recorded image files, on the basis of the designated condition and the attribution information stored in the attribution information file obtained by said file obtaining unit, control said file obtaining unit to obtain the image file discriminated as the image file which falls within the designated condition, and cause a display apparatus to display an image stored in each of the discriminated image files obtained by said file obtaining unit.

2. An information processing method of reading out image data from a recording medium on which the image data is recorded by an image capture apparatus, comprising the steps of:

obtaining, from the recording medium, an image file and an attribution information file a recorded on the recording medium by said image capture apparatus, the image file and the attribution information file being independent of each other so that the image file stores image data obtained from an image capture apparatus and the attribution information file stores attribution information of respective image data stored in the plurality of recorded image files, indicating settings which the image capture apparatus had when the image capture apparatus obtained the respective image data; and effecting control to control said file obtaining step so as to obtain the attribution information file prior to the image file, discriminating the image file which falls within a condition designated by a user among the plurality of recorded image files, on the basis of the designated condition and the attribution information stored in the attribution information file obtained by said file obtaining step, controlling said file obtaining step to obtain the image file discriminated as the image file which falls within the designated condition, and causing a display apparatus to display an image stored in each of the discriminated image files obtained by said file obtaining step.

3. A computer readable storage medium storing a computer-executable program comprising code for causing a computer to execute an information processing method of reading out image data from a recording medium on which the image data is recorded by an image capture apparatus, said method comprising the steps of:

obtaining, from the recording medium, an image file and an attribution information file recorded on the recording medium by said image capture apparatus, the image file and the attribution information file being independent of each other so that the image file stores image data obtained from an image capture apparatus and the attribution information file stores attribution information of respective image data stored in the plurality of recorded image files, indicating settings which the image capture apparatus had when the image capture apparatus obtained the respective image data; and effecting control to control said file obtaining step so as to obtain the attribution information file prior to the image file, discriminating the image file which falls within a condition designated by a user among the plurality of recorded image files, on the basis of the designated condition and the attribution information stored in the attribution information file obtained by said file obtaining step, controlling said file obtaining step to obtain the image file discriminated as the image file which falls within the designated condition, and causing a display apparatus to display an image stored in each of the discriminated image files obtained by said file obtaining step.

* * * * *